United States Patent
Fang et al.

(10) Patent No.: US 11,030,886 B2
(45) Date of Patent: Jun. 8, 2021

(54) METHOD AND DEVICE FOR UPDATING ONLINE SELF-LEARNING EVENT DETECTION MODEL

(71) Applicant: Hangzhou Hikvision Digital Technology Co., Ltd., Hangzhou (CN)

(72) Inventors: Jiale Fang, Hangzhou (CN); Peng Wang, Hangzhou (CN); Bin Guo, Hangzhou (CN); Xi Chen, Hangzhou (CN); Renguang Feng, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 504 days.

(21) Appl. No.: 16/071,467

(22) PCT Filed: Jun. 13, 2016

(86) PCT No.: PCT/CN2016/085530
§ 371 (c)(1),
(2) Date: Jul. 19, 2018

(87) PCT Pub. No.: WO2017/124683
PCT Pub. Date: Jul. 27, 2017

(65) Prior Publication Data
US 2021/0082279 A1    Mar. 18, 2021

(30) Foreign Application Priority Data
Jan. 21, 2016    (CN) .......................... 201610041602.0

(51) Int. Cl.
G06K 9/00    (2006.01)
G08B 31/00    (2006.01)
G08B 29/18    (2006.01)

(52) U.S. Cl.
CPC ............ *G08B 31/00* (2013.01); *G08B 29/186* (2013.01)

(58) Field of Classification Search
CPC ... G08B 31/00; G08B 13/248; G06K 9/00228
See application file for complete search history.

(56) References Cited

U.S. PATENT DOCUMENTS 6,990,520 B2    1/2006    Green et al.
8,649,594 B1    2/2014    Hua et al.
(Continued)

FOREIGN PATENT DOCUMENTS

CN    101399672 A    4/2009
CN    102601881 A    7/2012
(Continued)

OTHER PUBLICATIONS

Supplementary European Search Report.

*Primary Examiner* — Munear T Akki
(74) *Attorney, Agent, or Firm* — Blank Rome LLP

(57) ABSTRACT

Embodiments of the present application provide a method and apparatus for updating an online self-learning event detection model. The method includes: presenting, when at least one target alerting event generated by the current event detection model is detected, to a user the at least one target alerting event, so that the user provides an event result for each target alerting event based on the at least one presented target alerting event; obtaining the event result for each target alerting event provided by the user based on the at least one presented target alerting event; determining whether a target alerting event for which an event result has been provided by the user satisfies a predetermined update condition, and if so, training and obtaining a target event detection model based on at least one target alerting event for which an event result has been provided by the user and corresponding event result, and predetermined training
(Continued)

samples; and replacing the current event detection model with the target event detection model. By means of the method and apparatus according to the present application, the current event detection model may be continually updated, and thus improving the accuracy of the online learning.

10 Claims, 2 Drawing Sheets

(56) References Cited

U.S. PATENT DOCUMENTS

| | | | |
|---|---|---|---|
| 9,135,499 B2* | 9/2015 | Bergman | G08B 13/248 |
| 2003/0107650 A1* | 6/2003 | Colmenarez | G08B 13/19613 |
| | | | 348/150 |
| 2004/0111454 A1* | 6/2004 | Sorensen | G06Q 30/02 |
| | | | 708/200 |
| 2007/0182818 A1* | 8/2007 | Buehler | G08B 13/19641 |
| | | | 348/143 |
| 2007/0220034 A1 | 9/2007 | Iyer et al. | |
| 2012/0137367 A1* | 5/2012 | Dupont | G06F 21/00 |
| | | | 726/25 |
| 2013/0226655 A1* | 8/2013 | Shaw | G06F 30/20 |
| | | | 705/7.29 |
| 2013/0226850 A1 | 8/2013 | Hannuksela | |
| 2017/0256149 A1* | 9/2017 | Carey | G08B 31/00 |
| 2017/0323376 A1* | 11/2017 | Glaser | G06Q 20/203 |
| 2018/0253597 A1* | 9/2018 | Kozakaya | G08B 13/196 |

FOREIGN PATENT DOCUMENTS

| | | |
|---|---|---|
| CN | 102956032 A | 3/2013 |
| CN | 104200396 A | 12/2014 |
| CN | 104424752 A | 3/2015 |
| CN | 104504400 A | 4/2015 |

* cited by examiner

METHOD AND DEVICE FOR UPDATING ONLINE SELF-LEARNING EVENT DETECTION MODEL

This application is a U.S. National Stage Application based on International Application No. PCT/CN2016/085530, which claims priority to Chinese Patent Application No. 201610041602.0, filed on Jan. 21, 2016, which is incorporated herein by reference in its entirety.

TECHNICAL FIELD

The application relates to the field of data processing, and in particular to a method and apparatus for updating an online self-learning event detection model.

BACKGROUND

For a specific scene, a predefined event detection model may be used to perform an on-line self-learning based on input learning data (e.g., video and image), so as to give an alert on an event that satisfies some certain conditions. For example, in the field of vehicle, an intended lane departure due to a conscious lane-changing operation by a driver may be effectively distinguished from an unintended lane departure as a result of unconscious action, through on-line learning of the status of the vehicle's departure from the lane. An alert may then be generated and output on the unintended departure based on results of the learning.

In practice, however, occurrence of a certain number of false alerts may be inevitable, during the on-line learning using an event detection model, due to complexity of the scene. In addition, the same false alerts may recur in future learning if the same event detection model remains in use. As a result, the existing on-line learning method is limited by the comprehensiveness of the event detection model. The repeated use of the same event detection model for on-line learning may lead to a large amount of recurrence of identical false alerts. Thus, how to improve the event detection model to increase the accuracy of on-line learning is now a pressing issue to be solved.

SUMMARY

Embodiments of the present application are directed to a method and apparatus for updating an online self-learning event detection model, so as to improve the accuracy of online learning. The specific technical solution will be described below.

In a first aspect of the present application, a method for updating an online self-learning event detection model, which is applicable in an electronic device, is provided. The method may include:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model.

Further, before replacing the current event detection model with the target event detection model, the method further includes:

obtaining verification samples, and determining whether the false alert rate of the target event detection model is lower than that of the current event detection model based on the verification samples, wherein, the verification samples comprise at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result; and if so, replacing the current event detection model with the target event detection model.

Further, presenting at least one target alerting event to the user includes:

sending the at least one target alerting event to the user for presentation; or sending the at least one target alerting event to the user for presentation in response to receiving a request for viewing the at least one target alerting event from the user.

Further, the predefined update condition includes: the number of target alerting events for which event results have been provided by the user reaching a predetermined threshold, or a target alerting event for which an event result has been provided by the user occurring within a predefined period of time.

Further, the target alerting event is presented in a form of text, image, video, or audio.

In a second aspect of the present application, an apparatus for updating an online self-learning event detection model, which is applicable in an electronic device, is provided. The apparatus may include:

a presentation module, configured for presenting, when at least one target alerting event generated by the current event detection model is detected, to the user the at least one target alerting event, so that the user provides an event result for each target alerting event based on the presented target alerting event;

an obtaining module, configured for obtaining the event result for each target alerting event provided by the user based on the presented target alerting event;

an execution module, configured for determining whether the target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and the corresponding event results; and a replacement module, configured for replace the current event detection model with the target event detection model.

Further, the apparatus further includes:

a determination module, configured for obtaining verification samples, and determining whether the false alert rate of the target event detection model is lower than that of the current event detection model based on the verification samples, and if so, triggering the replacement module, wherein, a plurality of predefined reference events and corresponding event results, one or more historical alerting events for which one or more event results have been provided by the user and one or more corresponding event result, at least one target alerting event for which at least one event result has been provided by the user and corresponding event result.

Further, the presentation module is specifically configured for:

sending the at least one target alerting event to the user for presentation; or sending the at least one target alerting event to the user for presentation in response to receiving a request for viewing the target alerting event from the user.

Further, the predefined update condition includes: the number of target alerting events for which event results have been provided by the user reaching a predetermined threshold, or a target alerting event for which an event result has been provided by the user occurring within a predefined period of time.

Further, the target alerting event is presented in a form of text, image, video, or audio.

In a third aspect of the present application, a storage medium is provided. The storage medium is configured for storing application program, wherein, the application program is used for, when being executed, performing the method for updating an online self-learning event detection model according to the present application.

In a fourth aspect of the present application, an application program is provided. The application program is configured for, when being executed, performing the method for updating an online self-learning event detection model according to the present application.

In a fifth aspect of the present application, a updating device is provided, including:

a processor, a memory, communication interfaces, and a bus; wherein, the processor, the memory, and the communication interfaces are connected and communicated via the bus;

the memory is configured to store executable program codes;

the processor is configured to execute programs corresponding to the executable program codes by reading the executable program codes stored in the memory for:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model.

By means of the method and apparatus for updating an online self-learning event detection model according to embodiments of the present application, a target alerting event generated by the current event detection model is presented to a user, so that the user may provide an event result for each target alerting event; if the target alerting event for which an event result has been provided by the user satisfies a predetermined update condition, a target event detection model may be trained based on the target alerting event for which an event result has been provided by the user and the corresponding event result, and predetermined training samples; and then the current event detection model is replaced with the target event detection model, so as to continually update the current event detection model. In the case where the current event detection model generates a false alerting event, the target event detection model trained based on the event result for the false alerting event provided by the user will not generate the same false alerting event in future learning. When the updated target event detection model is used for online learning, the accuracy of the online learning can be increased.

BRIEF DESCRIPTION OF THE DRAWINGS

To describe the solutions of embodiments of the application and the prior art more clearly, the accompanying drawings to be configured in the embodiments and the prior art are described briefly below. Obviously, the accompanying drawings described below merely reflect some embodiments of the application, based on which those skilled in the art can obtain other drawings without creative efforts.

DETAILED DESCRIPTION

In order to ensure a better understanding of the solutions in embodiments of the present application, a clear, thorough description of the solution is provided in the following with reference to the drawings. Obviously, the described embodiments are merely a part of but not all the embodiments of the present application. All other embodiments obtained without creative efforts in view of the embodiments of the present application by those skilled in the art fall within scope of the present application.

It is noted that the embodiments of the present invention and the features therein may be combined with each other when no conflict occurs. With reference to the accompanying drawings, a detailed description of the present application is provided in conjunction with the embodiments.

For a specific scene, a predefined event detection model may be used to perform an on-line self-learning based on input learning data (e.g., video and image), so as to give an alert on an event that satisfies some condition. In practice, however, occurrence of a certain number of false alerts may be inevitable, during the on-line learning based on an event detection model, due to complexity of the scene. In addition, the same false alerts may recur in future learning if the same event detection model remains in use. As such, the existing on-line learning method is limited by the comprehensiveness of the event detection model. The repeated use of the same event detection model for on-line learning may lead to a large amount of recurrence of identical false alerts. Thus, it may be desired to update the event detection model.

Specifically, a new target event detection model may be trained to replace the currently used on-line event detection model. Samples for the training of the target event detection model are required in the first place. For example, alerting events generated by the current event detection model may be used as training samples, in order to obtain a target event detection model matched with a scene. As false alerts may arise from the current event detection model, the target event detection model directly obtained by using the alerting events generated by the current event detection model as the training samples may also have a high false alert rate.

In embodiments of the present application, a target event detection model is obtained based on feedback on alerting events from users.

Figure 1:
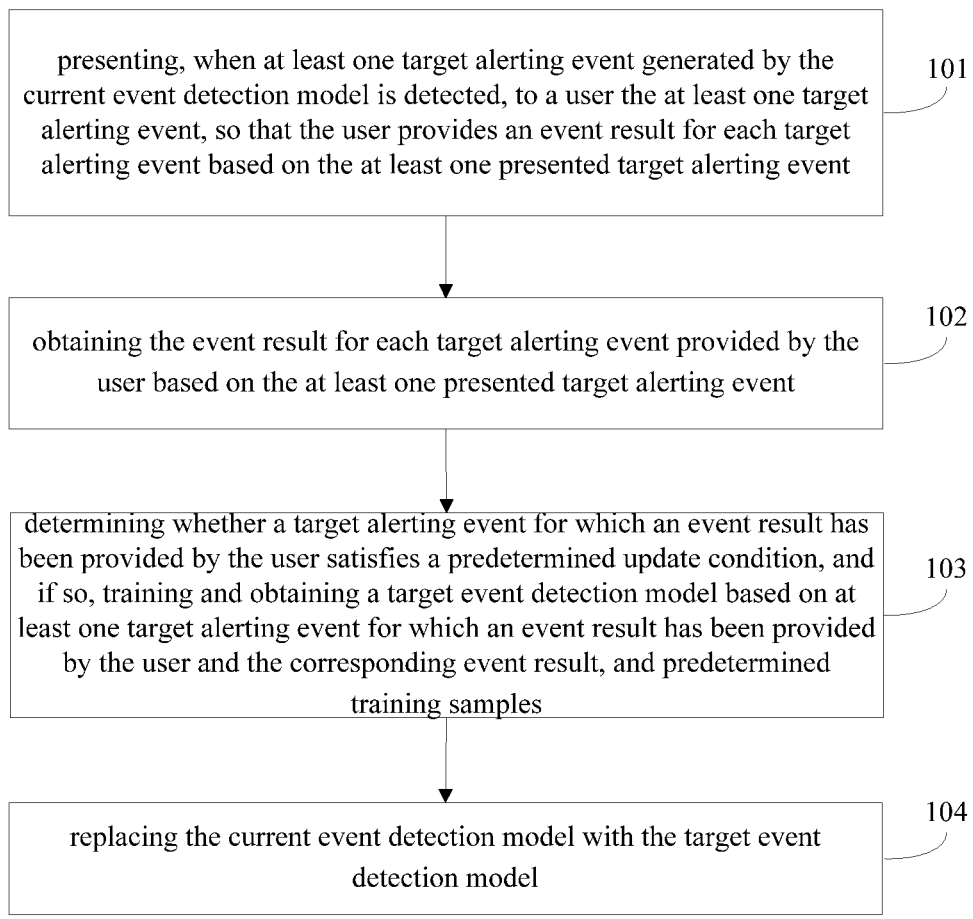
FIG. 1 is a schematic flowchart of a method for updating an online self-learning event detection model according to an embodiment of the present application.

FIG. 1 illustrates a schematic flow chart of a method for updating an online self-learning event detection model according to an embodiment of the present application. The method may include:

step 101: presenting, when at least one target alerting event generated by the current event detection model is detected, to a user the at least one target alerting event, so that the user provides an event result for each target alerting event based on the at least one presented target alerting event.

In this embodiment, when at least one target alerting event generated by the current event detection model is detected, the at least one target alerting event may be presented to the user, so that the user may provide an event result for each target alerting event based on the at least one presented target alerting event.

For example, in the field of vehicle, an lane departure due to an intended lane-changing operation by a driver and due to an unintended lane departure operation by a driver may be effectively distinguished through an on-line learning of the status of the vehicle departure from the lane; and an alert may then be issued for the unintended departure based on results of the learning to generate an alerting event and present it to the user.

Specifically, when presenting at least one target alerting event to the user, the electronic device may automatically present the at least one target alerting event to the user. Alternatively, the user may send a request for viewing the target alerting event to the electronic device; and the electronic device may present the at least one target alerting event to the user in response to receiving a request for viewing the target alerting event from the user.

Optionally, the electronic device may select one or more forms with which the target alerting event is presented, such as text, image, video and audio. In one implementation, the electronic device may select an appropriate form according to the characteristic of the target alerting event. In an example, each target alerting event may be set to have a respective danger level. A target alerting event with a lower danger level may be presented in the form of text or image, while a target alerting event with a high danger level may be presented in the form of audio or video such that the user may quickly review the target alerting event.

After the electronic device presents the target alerting event to the user, the user may provide an event result for the target alerting event based on the presented target alerting event. In other words, the user may confirm whether the alerting event is an exact alerting event or a false alerting event. For example, in a case where the electronic device is presenting to the user an alerting event for lane-departure, the user may confirm that the alerting event is exact if the user determines that the alerting event is directed to a lane-departure due to an unintended departure from lane; or otherwise, the user may confirm that the alerting event is false if the user determines that the alerting event is directed to a lane-departure due to an intended lane-changing operation. In a case where the electronic device is presenting to the user an alerting event for indicating that someone is passing through a warning line, the user may confirm that the alerting event is exact if the user determines that someone is indeed passing through the warning line; or otherwise, the user may confirm that the alerting event is false if the user determines that this alerting event is triggered by a windblown object or other reasons.

Step 102: obtaining the event result for each target alerting event provided by the user based on the at least one presented target alerting event.

After the user provides the event result for each target alerting event, the electronic device may obtain the event result for each target alerting event provided by the user based on the presented target alerting events so as to train and obtain a target event detection model based on the event result for each target alerting event.

Step 103: determining whether a target alerting event for which an event result has been provided by the user satisfies a predetermined update condition, and if so, training and obtaining a target event detection model based on at least one target alerting event for which an event result has been provided by the user and the corresponding event result, and predetermined training samples.

After obtaining the event results for the target alerting events, the electronic device may train a target event detection model based on the target alerting events and the corresponding event results.

It is appreciated that, in practice, if the electronic device trains a target event detection model whenever obtaining one or a few of event results for the target alerting events provided by the user, the immediately trained target event detection model may only have a minor difference with the current target event detection model, which would result in a large load on the electronic device.

As such, in this embodiment, the electronic device may first determine whether the target alerting events corresponding to the event results provided by the user satisfy a predetermined update condition; and if so, then train a target event detection model. The predetermined update condition may include, for example, the number of target alerting events for which event results have been provided by the user reaching a predetermined threshold (such as, 1000, 1500, 2000, etc.), or a target alerting event for which an event result has been provided by the user occurring within a predefined period of time.

The electronic device may train a target event detection model when the number of target alerting events corresponding to the event results provided by the user reaches the predetermined threshold. In some cases, a target event detection model may also be trained even if the number of target alerting events corresponding to the event results provided by the user has not reached the predetermined threshold. For example, in the field of vehicle, the number of generated target alerting events may vary significantly as traffic condition changes over different time periods. Thus, in a period with low traffic, it may take a long time to obtain a preset number of target alerting events corresponding to the event results provided by the user. As such, the period with a low traffic may be set as a predefined period. A target event detection model may also be trained when a target alerting event corresponding to an event result provided by the user occurs in this predefined period.

In the training of a target event detection model, to ensure the adaptability of the trained target event detection model, in addition to the at least one target alerting event and the corresponding event result provided by the user, the target event detection model can be trained further based on the predetermined training samples.

The predetermined training samples may include at least one of: a plurality of predefined reference events and corresponding event results, and a plurality of historical alerting events that have been confirmed by the user and corresponding event results. The predefined reference event may be an event for training an initial event detection model.

It is noted that, in the training of a target event detection model, the at least one target alerting event and the corresponding event result, the plurality of predefined reference events and the corresponding event results, and the plurality of historical alerting events that have been confirmed by the user and the corresponding event results may include not only the exact alerting events but also the false alerting events. The ratio of the exact alerting events to the false alerting events may be, but not limited to 1, 0.5, 0.6 and so on.

It is emphasized that, the target event detection model may be trained in the same manner as the current event detection model. As an example, in practice, the target event detection model may be trained through a convolutional neural network training method. In addition, the process and principle of the mentioned training method is not provided herein as they are not essential to inventive concept of the present application.

Step 104: replacing the current event detection model with the target event detection model.

The electronic device may replace the current event detection model with the target event detection model after obtaining the target event detection model, so that the target event detection model is used for online learning.

By means of the method for updating an online self-learning event detection model according to this embodiment, a target alerting event generated by the current event detection model is presented to a user, so that the user may provide an event result for each target alerting event; if the target alerting event for which an event result has been provided by the user satisfies a predetermined update condition, a target event detection model may be trained based on the target alerting event for which an event result has been provided by the user and the corresponding event result, and predetermined training samples; and then the current event detection model is replaced with the target event detection model, so as to continually update the current event detection model. In the case where the current event detection model generates a false alerting event, the target event detection model trained based on the event result for the false alerting event provided by the user will not generate the same false alerting event in future learning. When the updated target event detection model is used for online learning, the accuracy of the online learning can be increased.

Figure 2:
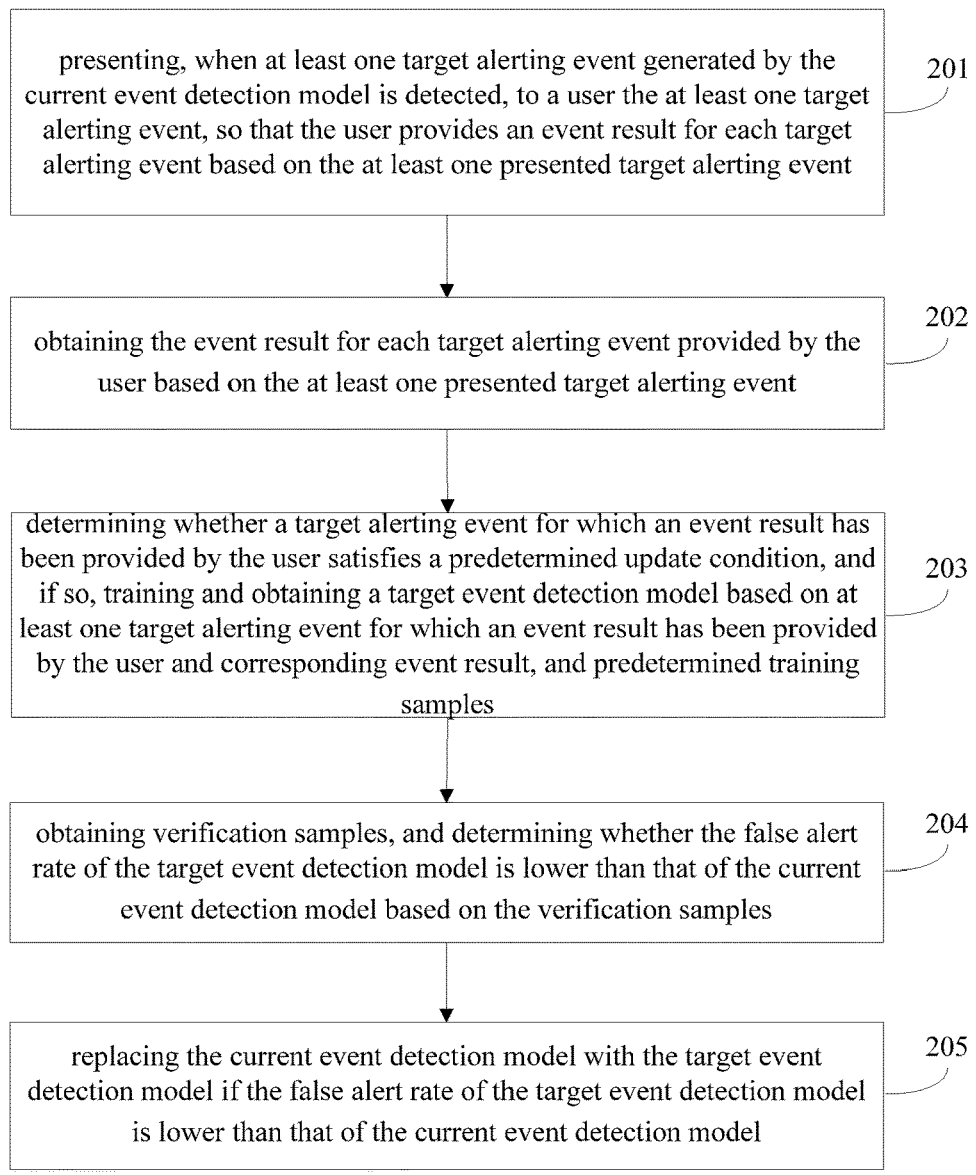
FIG. 2 is another schematic flowchart of a method for updating an online self-learning event detection model according to an embodiment of the present application.

FIG. 2 illustrates a schematic flow chart of the method for updating an online self-learning event detection model according to another embodiment of the present application. The method may include:

step 201: presenting, when at least one target alerting event generated by the current event detection model is detected, to a user the at least one target alerting event, so that the user provides an event result for each target alerting event based on the at least one presented target alerting event;

step 202: obtaining the event result for each target alerting event provided by the user based on the at least one presented target alerting event;

step 203: determining whether a target alerting event for which an event result has been provided by the user satisfies a predetermined update condition, and if so, training and obtaining a target event detection model based on at least one target alerting event for which an event result has been provided by the user and corresponding event result, and predetermined training samples.

It is noted that, the steps 201-203 in the present embodiment are similar with the steps 101-103 in the above embodiment, the detail of which are thus omitted here.

Step 204: obtaining verification samples, and determining whether the false alert rate of the target event detection model is lower than that of the current event detection model based on the verification samples.

In general, the false alert rate of the target event detection model trained based on the target alerting events and the corresponding event results provided by the user has a lower false alert rate than that of the current event detection model. In some cases, however, an inexact event result for a target alerting event due to some factors such as the user's misoperation would result in a high false alert rate of the target event detection model. In such cases, the replacing of the current event detection model with the target event detection model may reduce the accuracy of the online learning.

Thus, in this embodiment, to ensure the accuracy of the online learning, the electronic device may determine the false alert rate of the target event detection model and that of the current event detection model after obtaining the target event detection model.

Specifically, the electronic device may first obtain verification samples, and then determine, based on the verification samples, whether the false alert rate of the target event detection model is lower than that of the current event detection model.

In this embodiment, multiple types of events may be selected as the verification samples in order to ensure a reasonable comparison result. For example, the verification samples may include: a plurality of predefined reference events and corresponding event results, one or more historical alerting events for which one or more event results have been provided by the user and one or more corresponding event result, at least one target alerting event for which at least one event result has been provided by the user and corresponding event result.

Step 205: replacing the current event detection model with the target event detection model if the false alert rate of the target event detection model is lower than that of the current event detection model.

The electronic device may replace the current event detection model with the target event detection model if the false alert rate of the target event detection model is lower than that of the current event detection model, so as to use the target event detection model for the online learning.

In the method for updating an online self-learning event detection model according to this embodiment, through the comparing of the false alert rate of the target event detection model with that of the current event detection model by means of verification samples, the current event detection model would be replaced with the target event detection model only if the false alert rate of the target event detection model is lower than that of the current event detection model, so as to ensure that an optimum event detection model is currently used for online learning. The accuracy of online learning is thus further increased. In addition, the verification samples used for the comparison of the false alert rate of the target event detection model with that of the current event detection model may include at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result.

It is noted that, in the existing event detection system, the event detection model may be set in an event generator to output alerting events. In the embodiments of the present application, the current event detection model can be updated, so that the updated target event detection model is used to output alerting events, so as to improve the accuracy of the output of alerting events.

Specifically, in the embodiments of the present application, replacing the current event detection model with the target event detection model may include directly replacing the current event detection model in the event generator with the target event detection model. However, in some cases, the current event detection model in the event generator cannot be replaced by the target event detection model or the process of replacing is too complex due to some reasons such us hardware configuration. In such cases, the event generator may be followed by an event filter in which the current event detection model may be set. The current event detection model in the event filter is replaced with the trained target event detection model after a target event detection model is trained.

In this case, after the event generator generates an alerting event, the generated alerting event will pass through the event filter and be detected again by the event detection model in the event filter so as to output a final alerting event. Since the event detection model in the event filter is the target event detection model that is updated with the method for updating an online self-learning event detection model according to the embodiment of the present application, the alerting events output by the event filter is used as the final alerting events, and thus improving the accuracy of output of the alerting events.

Figure 3:
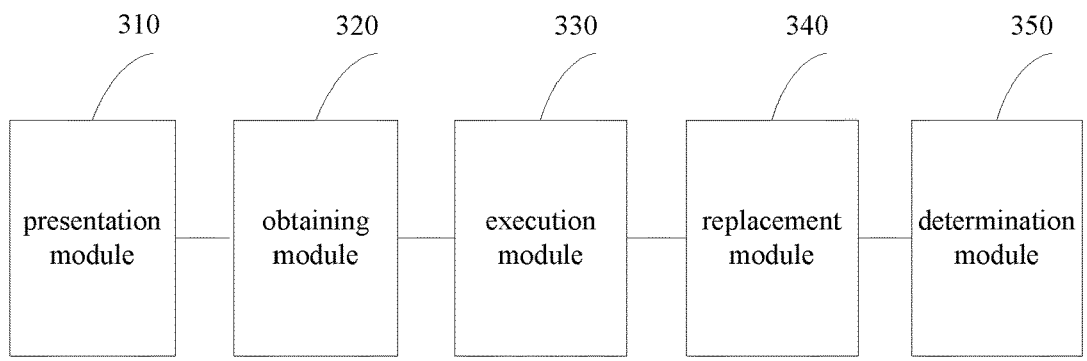
FIG. 3 is a schematic structural diagram of an apparatus for updating an online self-learning event detection model according to an embodiment of the present application.

FIG. 3 is a schematic structure diagram illustrating an apparatus for updating an online self-learning event detection model according to an embodiment of the present application. The apparatus, which is applicable in an electronic device, includes:

a presentation module 310, configured for presenting, when at least one target alerting event generated by the current event detection model is detected, to a user the at least one target alerting event, so that the user provides an event result for each target alerting event based on the at least one presented target alerting event;

an obtaining module 320, configured for obtaining the event result for each target alerting event provided by the user based on the at least one presented target alerting event;

an execution module 330, configured for determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and the corresponding event results; and a replacement module 340, configured for replace the current event detection model with the target event detection model.

Further, the presentation module 310 is specifically configured for: sending the at least one target alerting event to the user for presentation; or sending the at least one target alerting event to the user for presentation in response to receiving a request for viewing the at least one target alerting event from the user.

Further, the predefined update condition includes: the number of target alerting events for which event results have been provided by the user reaching a predetermined threshold, or a target alerting event for which an event result has been provided by the user occurring within a predefined period of time.

Further, the target alerting event is presented in a form of text, image, video, or audio.

In one embodiment of the present application, the apparatus may further include:

a determination module 350, configured for obtaining verification samples, and determining whether the false alert rate of the target event detection model is lower than that of the current event detection model based on the verification samples, and if so, triggering the replacement module 340, wherein, a plurality of predefined reference events and corresponding event results, one or more historical alerting events for which one or more event results have been provided by the user and one or more corresponding event result, at least one target alerting event for which at least one event result has been provided by the user and at least one corresponding event result.

By means of the apparatus for updating an online self-learning event detection model according to this embodiment, a target alerting event generated by the current event detection model is presented to a user, so that the user may provide an event result for each target alerting event; if the target alerting event for which an event result has been provided by the user satisfies a predetermined update condition, a target event detection model may be trained based on the target alerting event for which an event result has been provided by the user and the corresponding event result, and predetermined training samples; and then the current event detection model is replaced with the target event detection model, so as to continually update the current event detection model. In the case where the current event detection model generates a false alerting event, the target event detection model trained based on the event result for the false alerting event provided by the user will not generate the same false alerting event in future learning. When the updated target event detection model is used for online learning, the accuracy of the online learning can be increased.

On the other hand, through the comparing of the false alert rate of the target event detection model with that of the current event detection model by means of verification samples, the current event detection model would be replaced with the target event detection model only if the false alert rate of the target event detection model is lower than that of the current event detection model, so as to ensure that an optimum event detection model is currently used for online learning. The accuracy of online learning is thus further increased. In addition, the verification samples used for the comparison of the false alert rate of the target event detection model with that of the current event detection model may include at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result.

The present application further provides a storage medium for storing application programs, wherein, the application programs are used for, when being executed, performing the method for updating an online self-learning event detection model according to the present application. The method includes:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model.

The present application further provides an application program configured for performing the method for updating an online self-learning event detection model according to the present application. The method includes:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model.

The present application further provides a updating device, including:

a processor, a memory, communication interfaces, and a bus; wherein, the processor, the memory, and the communication interfaces are connected and communicated via the bus;

the memory is configured to store executable program codes;

the processor is configured to execute programs corresponding to the executable program codes by reading the executable program codes stored in the memory for:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model.

A brief description is provided as to the apparatus embodiments in view of the substantial resemblance with the method embodiments, to which reference may be made for relevant details.

It should be noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "include," "include" or any other variants are intended to cover a non-exclusive inclusion, such that processes, methods, objects or devices including a series of elements include not only those elements, but also other elements not specified or the elements inherent to those processes, methods, objects or devices. Without further limitations, elements limited by the phrase "include(s) a . . . " do not exclude that there are other identical elements in the processes, methods, objects or devices that include that element.

The various embodiments in the specification are described in an interrelated way, and one need only refer to the same or similar portions of the various embodiments, with the focus of description for each embodiment being placed on the difference(s) with other embodiments. In particular, for system embodiments, as they are basically similar to the method embodiments, their description is relatively simply, and one need only refer to relevant parts of the description of the method embodiments.

Those of ordinary skill in the art may appreciate that all or a part of the embodiments described above may be implemented by instructing relevant hardware through a program. The program may be stored in a computer readable storage medium such as a ROM/RAM, magnetic disk, and optic disk.

What has been described above are merely preferred embodiments of the application, and are not used to limit the application. Any modification, equivalent replacement or improvement made within the spirit and principle of the application falls within the scope of protection of the application.

What is claimed is:

1. A method for updating an online self-learning event detection model, which is applicable in an electronic device, comprising:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model, wherein, before replacing the current event detection model with the target event detection model, the method further comprises:

obtaining verification samples, and determining whether the false alert rate of the target event detection model is lower than that of the current event detection model based on the verification samples, wherein, the verification samples comprise at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result; and if so, replacing the current event detection model with the target event detection model.

2. The method of claim 1, wherein, presenting at least one target alerting event to the user comprises:

sending the at least one target alerting event to the user for presentation; or sending the at least one target alerting event to the user for presentation in response to receiving a request for viewing the at least one target alerting event from the user.

3. The method of claim 1, wherein, the predefined update condition comprises: the number of target alerting events for which event results have been provided by the user reaching a predetermined threshold, or a target alerting event for which an event result has been provided by the user occurring within a predefined period of time.

4. The method of claim 1, wherein, the target alerting event is presented in a form of text, image, video, or audio.

5. A storage medium for storing application programs, wherein, the application programs are used for performing the method for updating an online self-learning event detection model of claim 1 when being executed.

6. A updating device, comprising:

a processor, a memory, communication interfaces, and a bus; wherein, the processor, the memory, and the communication interfaces are connected and communicated via the bus;

the memory is configured to store executable program codes;

the processor is configured to execute programs corresponding to the executable program codes by reading the executable program codes stored in the memory in order to perform:

presenting, when at least one target alerting event generated by the current event detection model is detected, to a user the at least one target alerting event, so that the user provides an event result for each target alerting event based on the at least one presented target alerting event;

obtaining the event result for each target alerting event provided by the user based on the at least one presented target alerting event;

determining whether a target alerting event for which an event result has been provided by the user satisfies a predetermined update condition, and if so, training and obtaining a target event detection model based on at least one target alerting event for which an event result has been provided by the user and corresponding event result, and predetermined training samples, wherein the predetermined training samples comprise at least one of: a plurality of predefined reference events and corresponding event results, and a plurality of historical alerting events that have been confirmed by the user and corresponding event results; and replacing the current event detection model with the target event detection model, wherein, before replacing the current event detection model with the target event detection model, the method further comprises:

obtaining verification samples, and determining whether the false alert rate of the target event detection model is lower than that of the current event detection model based on the verification samples, wherein, the verification samples comprise at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result; and if so, replacing the current event detection model with the target event detection model.

7. The updating device of claim 6, wherein, before replacing the current event detection model with the target event detection model, the processor is further configured to execute programs corresponding to the executable program codes by reading the executable program codes stored in the memory in order to perform:

obtaining verification samples, and determining whether the false alert rate of the target event detection model is lower than that of the current event detection model based on the verification samples, wherein, the verification samples comprise at least one of: a plurality of predefined reference events and corresponding event results, one or more historical alerting events for which one or more event results have been provided by the user and one or more corresponding event result, at least one target alerting event for which at least one event result has been provided by the user and at least one corresponding event result; and if so, replacing the current event detection model with the target event detection model.

8. The updating device of claim 6, wherein, presenting at least one target alerting event to the user comprises:

sending the at least one target alerting event to the user for presentation; or sending the at least one target alerting event to the user for presentation in response to receiving a request for viewing the at least one target alerting event from the user.

9. The updating device of claim 6, wherein, the predefined update condition comprises: the number of target alerting events for which event results have been provided by the user reaching a predetermined threshold, or a target alerting event for which an event result has been provided by the user occurring within a predefined period of time.

10. The updating device of claim 6, wherein, the target alerting event is presented in a form of text, image, video, or audio.

* * * * *